United States Patent Office 3,767,689
Patented Oct. 23, 1973

3,767,689
METHOD OF PREPARING AN AQUEOUS SOLUTION OF A WATER-SOLUBLE SALT OF A FERRIC AMINOPOLYCARBOXYLIC ACID COMPLEX
Thomas S. Donovan, Ontario, and John J. Surash, Rochester, N.Y., assignors to Eastman Kodak Company, Rochester, N.Y.
No Drawing. Continuation-in-part of application Ser. No. 75,761, Sept. 25, 1970, which is a continuation-in-part of application Ser. No. 11,783, Feb. 16, 1970, both now abandoned. This appplication Dec. 28, 1971, Ser. No. 213,183
Int. Cl. C07f 15/02
U.S. Cl. 260—439 R
7 Claims

ABSTRACT OF THE DISCLOSURE

An aqueous solution of an ammonium salt of a ferric aminopolycarboxylic acid complex is prepared by heating iron oxide with an aminopolycarboxylic acid, in an aqueous ammoniacal medium and neutralizing with an ammonium base. The iron oxide employed may be ferric oxide, ferrous oxide or ferroso-ferric oxide. The aqueous solution prepared by this method is free of extraneous ions and is especially useful for the preparation of bleach-fix solutions for use in photographic processing.

This is a continuation-in-part of application Ser. No. 75,761, filed Sept. 25, 1970 and now abandoned, which in turn is a continuation-in-part of application Ser. No. 11,783, filed Feb. 16, 1970 and now abandoned.

This invention relates in general to ferric complexes of aminopolycarboxylic acids and in particular to a novel method of preparing aqueous solutions of water-soluble salts of such complexes.

Water-soluble salts of ferric aminopolycarboxylic acid complexes are a well-known class of compounds. Typical examples are salts of the ferric complex of ethylenediaminetetraacetic acid, such acid being hereinafter known as EDTA. One of the uses for this class of compounds is as a component of bleach-fix baths which are employed in photographic processing, as described, for example, in German Pat. 866,605, British Pat. 991,412 and U.S. Pat. 3,293,036.

A serious problem involved in the preparation of bleach-fix baths containing water-soluble salts of ferric aminopolycarboxylic acid complexes, such as the ammonium salt of ferric EDTA, is the introduction into the bath of ions which are associated with the salt as a result of its process of manufacture and have a detrimental effect on the functioning of the bath. Thus, for example, it is known to prepare the ammonium salt of ferric EDTA which may also be named as ammonium ethylenedinitrilotetraacetato ferrate(III), by heating an aqueous solution of a soluble ferric salt, such as ferric nitrate, ferric sulfate or ferric chloride, with EDTA. However, the resulting product is contaminated with the unwanted nitrate, sulfate or chloride ions. It is also known to avoid such contamination by reacting the soluble ferric salt with ammonia to precipitate ferric hydroxide, freeing the ferric hydroxide from the anions by repeatedly washing, centrifuging and decanting, then reacting the ferric hydroxide with EDTA and neutralizing with ammonium hydroxide. For a description of this procedure, reference may be made to J. L. Lambert et al., Inorg. Chem., 2127 (1963). While this method is effective, it is undesirable for use on a commercial scale because of the need for expensive equipment to effect the separation of the ferric hydroxide from the associated ions and the excessive amount of labor which is involved.

It has now been discovered that an aqueous solution of a water-soluble salt of a ferric aminopolycarboxylic acid complex can be prepared, without the need to isolate any intermediates or carry out any purification steps, by heating iron oxide with an aminopolycarboxylic acid, or a partially neutralized aminopolycarboxylic acid, in an aqueous medium and neutralizing the resulting ferric complex by reacting it with a base. The resulting solution is fully satisfactory for the preparation of a bleach-fix bath and the process may be conducted with simple equipment and a minimum of labor costs, which renders it especially advantageous for use on a commercial scale.

The iron oxide employed as a starting material may be ferric oxide ($Fe_2O_3$) other than the red form or iron sesquioxide, ferrous oxide (FeO) or ferroso-ferric oxide ($Fe_3O_4$). Iron which is in the ferrous state will be oxidized to the ferric state during the reaction and, when all or a major proportion of the iron oxide utilized as a starting material is in the ferrous state, it is desirable to bubble air through the reaction mixture to promote the oxidation. It is preferred to employ ferroso-ferric oxide as a starting material for the reaction as it provides optimum results with respect to reaction rate.

For the purposes of this invention, the iron oxide can be reacted with any of the aminopolycarboxylic acids which are capable of chelating iron. Illustrative examples of such acids are the following:

nitrilotriacetic acid,
ethylenediaminetetraacetic acid,
diethylenetriaminepentaacetic acid,
ortho-diamine cyclohexane tetraacetic acid,
ethylene glycol bis(aminoethyl ether)tetraacetic acid,
diaminopropanol tetraacetic acid,
N-(2-hydroxyethyl) ethylenediamine triacetic acid,
ethyliminodipropionic acid,
N-(carboxymethyl)-N'-2-hydroxyethyl-N,N'-ethylenediglycine, and the like. Many other similar acids can also be employed with equivalent results.

Following reaction of the iron oxide with the aminopolycarboxylic acid, the reaction product is treated with a base to effect neutralization. Examples of suitable bases are the ammonium or alkali metal bases, such as ammonium hydroxide, sodium hydroxide or potassium hydroxide. Neutralization can also be carried out with a water-soluble amine base, including primary, secondary, tertiary or quaternary aliphatic, cycloaliphatic, aromatic or heterocyclic amines. Examples of suitable amines include methyl amine, dimethyl amine, trimethyl amine, ethyl amine, diethylamine, triethyl amine, monoethanolamine, diethanolamine, triethanolamine, propyl amine, butyl amine, amyl amine, hexyl amine, cyclohexyl amine, aniline, m-toluidine, pyridine, methyl pyridine, morpholine, piperidine, and the like.

The reaction of the iron oxide and the aminopolycarboxylic acid is preferably conducted at temperatures of from about 180° F. to about 220° F. and reaction times of from several minutes to several hours may be employed. It is advantageous to utilize a relatively short reaction period, within the range of from about 5 to about 20 minutes, in order to minimize any tendency to decompose the aminopolycarboxylic acid, and these short reaction periods give fully satisfactory results when ferroso-ferric oxide ($Fe_3O_4$) is employed. However, when the iron oxide used is ferric oxide ($Fe_2O_3$), then temperatures toward the higher end of the aforesaid range, e.g. 215° F. to 220° F., and reaction times of about 45 to about 60 minutes should be used. It must be pointed out that even under the preferred conditions described hereinabove and hereinafter, the red form of iron oxide ($Fe_2O_3$) (i.e. the form identified as iron sesquioxide at page 567 of the Merck Index, 7th edition, 1960) does not react satisfactorily in the process of the present invention as demonstrated in the examples below. Thus, the iron oxide used in successful practice of the present invention may be ferrosoferric oxide ($Fe_3O_4$) commonly referred to as the black-form, and hematite ($Fe_2O_3$) commonly referred to as brown iron oxide or sometimes the yellow form when it is hydrated (i.e. $Fe_2O_3 \cdot H_2O$, $Fe_2O_3 \cdot 2H_2O$).

It will ordinarily be advantageous for a portion of the total amount of base required for neutralization to be provided at the start of the reaction in order to promote solution of the aminopolycarboxylic acid in the reaction medium. Alternatively, a partially neutralized aminopolycarboxylic acid can be employed as a starting material rather than the free acid; however, the fully neutralized acid cannot be used as it is incapable of reacting with the iron oxide. Mixtures of the free acid and the partially neutralized acid are also suitable starting materials.

In preparing the ammonium salt of ferric EDTA by the method of this invention, good results are obtained when the EDTA is employed in slight excess over the stoichiometric proportion required for reaction with the iron oxide, for example, a ten percent excess. It is also especially advantageous for some of the ammonium hydroxide to be provided at the start of the reaction, i.e. to heat the iron oxide with EDTA in aqueous ammoniacal medium, in order to promote solution of the EDTA and thereby enhance the rate of reaction. For this purpose, amounts of from about 0.1 mole up to one mole of ammonium hydroxide for each mole of EDTA are suitably employed. Greater amounts than this will not further increase the rate of reaction, too large an amount must be avoided since full neutralization of the EDTA with ammonia at the beginning will prevent the reaction with iron oxide from occurring and amounts less than the minimum of this range will result in a reaction which if it proceeds at all is so slow as to be non-reactive in any commercial sense. After reaction of the iron oxide with the EDTA has taken place, additional ammonia is added to ensure that neutralization of all of the ferric EDTA complex takes place and to raise the pH of the solution at 80° F. to about 7, at which level the solution exhibits optimum characteristics with respect to stability. The solution may be filtered, if necessary, to remove any insolubles. It is preferred to add about 0.8 mole of ammonium hydroxide per mole of EDTA initially and then add about 1.5 additional moles of ammonium hydroxide per mole of EDTA after formation of the ferric EDTA complex. Similar procedures and proportions are suitably employed in preparing alkali metal or amine salts of ferric EDTA or in preparing water-soluble salts of other ferric aminopolycarboxylic acid complexes.

Aqueous solutions of water-soluble salts of ferric aminopolycarboxylic acid complexes prepared by the method described hereinabove may be employed without any further treatment in formulating a bleach-fix bath for use in photographic processing. However, for other uses it may be desirable to recover the salt from the solution and this can be readily accomplished by, for example, evaporating the water or adding a diluent to cause the salt to crystallize.

The invention is further illustrated by the following examples of its practice.

EXAMPLE 1

To a slurry of 512 grams (1.75 moles) of ethylenediaminetetraacetic acid in 430 milliliters of water at 190° F. there was added 103 milliliters (1.5 moles) of 28% aqueous ammonia. While continually agitating, 125.3 grams (0.54 mole) of iron oxide ($Fe_3O_4$) was added in increments over a period of 2 to 5 minutes while maintaining the temperature at or near the boiling point. After an additional 2 to 5 minutes of heating and stirring, the mixture was cooled to about 160° F. and then 172 milliliters (2.5 moles) of 28% aqueous ammonia was added, with the result that the solution became clear and an intense dark red color. The solution had a pH of 7.1 at 80° F. and analysis showed it to be 1.5 molar in ammonium ferric EDTA and 1.75 molar in total EDTA (free and complexed).

EXAMPLE 2

To 430 milliliters of water at a temperature of 190° F. there was added 512 grams (1.75 moles) of ethylene diaminetetraacetic acid. While continually agitating at a very high rate to prevent caking, 125.3 grams (0.54 mole) of iron oxide ($Fe_3O_4$) was added in increments over a period of 2 to 5 minutes during which time the temperature was maintained at or near the boiling point. After an additional 15 to 20 minutes of heating and stirring, 5 milliliters (0.07 mole) of 28% aqueous ammonia was added to accelerate the reaction. Heating and stirring were continued for an additional 2 to 5 minutes, after which the mixture was cooled to about 160° F. and 270 milliliters (4.00 moles) of 28% aqueous ammonia was added. The resulting solution was slightly cloudy in appearance but after filtering the solution was clear and had an intense dark red color. Approximately 35 milliliters (0.5 mole) of 28% aqueous ammonia was added to the filtered solution to raise the pH to 7.10 at 80° F. Analysis of the solution showed it to be 1.5 molar in ammonium ferric EDTA and 1.60 molar in total EDTA (free and complexed).

EXAMPLE 3

To a one-liter, three-neck, standard tapered reaction flask, equipped with a water-cooled condenser, stirrer and heating mantle, there was added 215 milliliters of boiling water and then 256 grams (0.875 mole) of ethylenediaminetetraacetic acid was added to the flask followed by 51 milliliters (0.75 mole) of 28% aqueous ammonia. While continually agitating, 63.55 grams (0.40 mole) of iron oxide ($Fe_2O_3$) (hematite) was added in increments over a time period of 2 to 5 minutes. The temperature was then increased to about 215° F. to 220° F. and maintained there for about 45 to 60 minutes. The reaction mixture was then cooled to about 160° F. and 86 milliliters (1.27 moles) of 28% aqueous ammonia was added, with the result that the solution became clear and intensely red in color. Analysis of the solution showed it to have a pH of 7.2 at 80° F. and to be 1.5 molar in ammonium ferric EDTA and 1.63 molar in total EDTA (free and complexed).

EXAMPLE 4

To 600 milliliters of water at a temperature of 190° F. there was added 336 grams (1.76 moles) of nitrilotriacetic acid. While continually agitating at a very high rate to prevent caking, 33 milliliters of 28% aqueous ammonia was added to dissolve some of the nitrilotriacetic acid and then 62.65 grams (0.27 mole) of iron oxide ($Fe_3O_4$) was added in increments over a period of 1 to 3 minutes, during which the temperature was maintained at or near the boiling point. Heating and stirring were continued for an additional 20 to 25 minutes, after which the mixture was cooled to about 100° F. and 175 milliliters (2.59 moles) of 28% aqueous ammonia was added. The resulting solution, which was slightly cloudy in appearance, was filtered to give a clear solution with an intense dark brownish-yellow color. The final volume of solution was 880 milliliters and the solution had a pH of 7.0 at 80° F. Analysis showed it to be 0.93 molar in the ammonium ferric complex of nitrilotriacetic acid and 1.94 molar in total nitrilotriacetic acid (free and complexed).

EXAMPLE 5

The ammonium ferric complex of N-(carboxymethyl)-N-(carboxymethyl) - N' - 2 - hydroxyethyl-N,N'-ethylenediglycine was prepared in a similar manner to that described in Example 4 utilizing the following proportions and reaction conditions:

Water: 300 milliliters
N-(carboxymethyl)-N'-2-hydroxyethyl - N,N' - ethyleneglycine: 320 grams (1.15 moles)
First addition of ammonia (28% solution): 66 milliliters (0.98 moles)
Iron oxide ($Fe_3O_4$): 77.2 grams (0.36 mole)
Reaction time: 20 to 25 minutes
Second addition of ammonia (28% solution): 40 milliliters (0.59 mole)

After filtering, the solution had a volume of 600 milliliters, an intense dark red color, and a pH of 6.20 at 80° F. Analysis showed it to be 1.59 molar in the ammonium ferric complex of N-(carboxymethyl)-N'-2-hydroxyethyl-N,N'-ethylenediglycine and 1.92 molar in total N-(carboxymethyl)-N'-2-hydroxyethyl - N,N' - ethyleneglycine (free and complexed).

EXAMPLE 6

Monohydroxyethyl ammonium ferric EDTA was prepared in a similar manner to that described in Example 4 utilizing the following proportions and reaction conditions:

Water: 300 milliliters
Ethylenediaminetetraacetic acid: 328 grams (1.12 moles)
Monoethanolamine (first addition): 60 milliliters (1.00 mole)
Iron oxide ($Fe_3O_4$) (hematite): 77.2 grams (0.36 mole)
Reaction time: 15 to 20 minutes
Monoethanolamine (second addition): 87 milliliters (1.45 moles)

At the completion of the neutralization, sufficient water was added to raise the voulme of the solution to 900 milliliters. The filtered solution had an intense dark red color and a pH of 7.0 at 80° F. Analysis showed it to be 1.10 molar in monohydroxy ethyl ammonium ferric EDTA and 1.23 molar in total EDTA (free and complexed).

EXAMPLE 7

Bis-(hydroxyethyl) ammonium ferric EDTA was prepared in a similar manner to that described in Example 4 utilizing the following proportions and reaction conditions:

Water: 300 milliliters
Ethylenediaminetetraacetic acid: 328 grams (1.12 moles)
Diethanolamine, 90% by weight solution (first addition): 116 grams (1.00 mole)
Iron oxide ($Fe_3O_4$): 77.2 grams (0.36 mole)
Reaction time: 15 to 20 minutes
Diethanolamine, 90% by weight solution (second addition): 176 grams (1.52 moles)

At the completion of the neutralization, sufficient water was added to raise the volume of the solution to 900 milliliters. The filtered solution had an intense dark red color and a pH of 7.0 at 80° F. Analysis showed it to be 1.08 molar in bis-(hydroxyethyl) ammonium ferric EDTA and 1.20 molar in total EDTA (free and complexed).

EXAMPLE 8

Tris-(hydroxyethyl) ammonium ferric EDTA was prepared in a similar manner to that described in Example 4 utilizing the following proportions and reaction conditions:

Water: 300 milliliters
Ethylenediaminetetraacetic acid: 328 grams (1.12 moles)
Triethanolamine (first addition): 153 milliliters (1.15 moles)
Iron oxide ($Fe_3O_4$): 77.2 grams (0.36 mole)
Reaction time: 15 to 20 minutes
Triethanolamine (second addition): 193 milliliters (1.45 moles)

At the completion of the neutralization, sufficient water was added to raise the volume of the solution to 1000 milliliters and 20 grams (0.07 mole) of EDTA was added to establish a pH of 7.0 at 80° F. The filtered solution was an intense dark red color. Analysis showed it to be 1.00 molar in tris(hydroxyethyl) ammonium ferric EDTA.

EXAMPLE 9

To 683 milliliters (1.12 moles) of an aqueous solution of diammonium EDTA (40% solution as EDTA, pH 5.0 at 80° F.) there was added 77.2 grams (0.36 mole) of iron oxide ($Fe_3O_4$). The iron oxide was added in increments over a period of 1 to 3 minutes during which the temperature was maintained at or near the boiling point. Heating and stirring was continued for an additional 60 to 65 minutes, after which the mixture was cooled to about 100° F. and 44 milliliters (0.65 mole) of 28% aqueous ammonia was added. The resulting solution was filtered to give 650 milliliters of a clear solution with an intense dark red color and a pH of 7.0 at 80° F. Analysis showed it to be 1.11 molar in ammonium ferric EDTA and 1.44 molar in total EDTA (free and complexed).

EXAMPLE 10

To 346 milliliters (0.56 mole EDTA) of a diammonium ethylenediaminetetraacetic acid aqueous concentrate (40% by weight as EDTA) at 190° F., there was added 164 grams (0.56 mole) of ethylenediaminetetraacetic acid. While continually agitating, 77.2 grams (0.36 mole) of iron oxide ($Fe_3O_4$) was added in increments over a period of 2 to 5 minutes while maintaining the temperature at or near the boiling point. After an additional 2 to 5 minutes of heating and stirring, the mixture was cooled to about 100° F., and 100 milliliters (1.48 moles) of 28% aqueous ammonia was added. The filtered solution had an intense dark red color and a pH of 7.1 at 80° F. Analysis showed it to be 1.51 molar in ammonium ferric EDTA and 1.70 molar in total EDTA (free and complexed).

EXAMPLE 11

To 300 milliliters of water (boiling), were added 22 milliliters ammonium hydroxide (28%) 105 grams EDTA, 7.64 ml. concentrated $HNO_3$ and 42.7 grams $Fe_2O_3 \cdot H_2O$ (yellow form). The temperature was then raised to 220° F. and maintained between 214 and 220° F. for a period of 2 hours and 25 minutes at which time the reaction appeared complete. Heating at 220° F. was continued for 20 minutes after which the mixture was cooled to about 100° F. and an additional 50 milliliters of 28% ammonia added. The resulting solution was filtered as described in the foregoing examples. Analysis indicated that the reaction had proceeded successfully as described in the foregoing examples.

EXAMPLE 12

The process of Example 11 was repeated except that red $Fe_2O_3$ (rouge) was used as the source of iron oxide, no nitric acid was used and 157.3 grams of EDTA were added at the start. After heating under reflux for 5 hours at 218° F. no reaction had occurred.

EXAMPLE 13

In order to determine the reactivity of $Fe_3O_4$ with EDTA in the absence of ammonia 512 grams of EDTA were added to 430 milliliters of water at 190° F. At this point caking had just about begun. To insure that caking did not occur stirrer speed was increased and 125.3 g. of $Fe_3O_4$ was added to the slurry. At this point the temperature dropped to 140° F. The temperature of the mixture was then raised to 190° F. After about 15 to 20 minutes some insignificant appearance of reactivity appeared. Addition of 6 milliliters of 28% ammonia resulted in an immediate acceleration of the reaction. 270 milliliters of ammonia was then added slowly over a period of about 7 minutes. After cooling to 80° F. the solution appeared slightly cloudy. Filtering yielded a clear solution having a pH of 6.5 at 80° F. Adjustment of the pH to 7.1 by the addition of 35 milliliters of ammonium hydroxide produced a clear red solution with an analysis showing a 1.53 molar concentration of iron and a 1.60 molar concentration of EDTA.

It thus appears that the addition of at least about 0.1 mole of ammonium hydroxide accelerates the reaction to a useful rate. Addition of higher amounts of ammonium hydroxide up to about 1 mole at the start of the reaction either directly to the reaction mixture or in the form of partially neutralized EDTA, as demonstrated in the foregoing examples produces a similar result.

The invention has been described in detail with particular reference to preferred embodiments thereof, but it will be understood that variations and modifications can be effected within the spirit and scope of the invention.

We claim:

1. A method for preparing an aqueous solution of the ammonium salt of a ferric aminopolycarboxylic acid complex comprising the steps of heating an iron oxide selected from the group consisting of hematite and ferroso-ferric oxide with an aminopolycarboxylic acid in an aqueous ammoniacal medium containing from about 0.1 mole up to one mole of ammonium hydroxide for each mole of said aminopolycarboxylic acid and neutralizing the resulting ferric complex of said aminopolycarboxylic acid with additional ammonium hydroxide.

2. A method for preparing an aqueous solution of the ammonium salt of a ferric aminopolycarboxylic acid complex comprising the steps of heating an iron oxide selected from the group consisting of hematite and ferroso-ferric oxide with an aminopolycarboxylic acid selected from the group consisting of ethylenediaminetetraacetic acid, nitrilotriacetic acid and N-(carboxymethyl)-N'-2-hydroxyethyl-N,N'-ethylenediglycine in an aqueous ammoniacal medium containing from about 0.1 mole up to one mole of ammonium hydroxide for each mole of said aminopolycarboxylic acid and neutralizing the resulting ferric complex of said aminopolycarboxylic acid with additional ammonium hydroxide.

3. A method for preparing an aqueous solution of the ammonium salt of ferric ethylenediaminetetraacetic acid comprising the steps of heating an iron oxide selected from the group consisting of hematite and ferroso-ferric oxide with ethylenediaminetetraacetic acid in an aqueous ammoniacal medium containing from about 1.0 mole up to one mole of ammonium hydroxide for each mole of ethylenediaminetetraacetic acid and neutralizing the resulting ferric complex of ethylenediaminetetraacetic acid with additional ammonium hydroxide.

4. The method of claim 3 wherein the oxide is heated with the ethylenediaminetetraacetic acid at a temperature of about 180° F. to about 220° F.

5. The method of claim 4 wherein the ammoniacal medium contains about 0.8 mole of ammonium hydroxide per mole of ethylenediaminetetraacetic acid and neutralization is completed by providing about 1.5 moles of additional ammonium hydroxide per mole of ethylenediaminetetraacetic acid.

6. The method of claim 5 wherein the iron oxide is ferroso-ferric oxide and the aqueous ammoniacal medium containing the ferroso-ferric oxide and ethylenediaminetetraacetic acid is heated at a temperature of about 180° F. to about 220° F. for a period of from about 5 to about 20 minutes.

7. The method of claim 5 wherein the iron oxide is hematite and the aqueous ammoniacal medium containing the hematite and ethylenediaminetetraacetic acid is heated at a temperature of about 215° F. to about 220° F. for a period of from about 45 to about 60 minutes.

References Cited
UNITED STATES PATENTS

| | | | |
|---|---|---|---|
| 3,557,200 | 1/1971 | Bersworth | 260—534 |
| 3,150,160 | 9/1964 | Dexter | 260—439 |
| 3,632,637 | 1/1972 | Martell | 260—429 J |

DANIEL E. WYMAN, Primary Examiner

A. P. DEMERS, Assistant Examiner

U.S. Cl. X.R.

96—49; 260—429 J